United States Patent [19]

Itoh

[11] Patent Number: 4,882,051

[45] Date of Patent: Nov. 21, 1989

[54] CARTRIDGE FILTER INCORPORATING A BAG-LIKE BODY

[75] Inventor: Mikio Itoh, Tokyo, Japan

[73] Assignee: Nippon Roki Co., Ltd., Tokyo, Japan

[21] Appl. No.: 216,306

[22] Filed: Jul. 8, 1988

[30] Foreign Application Priority Data

May 26, 1986 [JP] Japan ............................. 63-68757[U]
Apr. 30, 1988 [JP] Japan ............................. 63-57314[U]

[51] Int. Cl.⁴ ...................... B01D 27/08; B01D 35/16
[52] U.S. Cl. ..................................... 210/248; 210/441;
210/445; 210/448; 210/452; 210/455; 217/3 R;
220/415; 220/DIG. 5
[58] Field of Search ............... 210/248, 441, 445, 448,
210/452, 455, 415, 470, DIG. 5; 217/3 R

[56] References Cited

U.S. PATENT DOCUMENTS

| 3,288,290 | 11/1966 | Rosaen ................................ 210/248 |
| 4,451,368 | 5/1984 | Pandelana et al. ................. 210/248 |
| 4,642,183 | 2/1987 | Hebert ................................ 210/248 |

Primary Examiner—Richard V. Fisher
Assistant Examiner—Wanda L. Millard
Attorney, Agent, or Firm—Donald W. Hanson

[57] ABSTRACT

This invention has an object to provide a cartridge filter which can prevent the interior of a filter housing from being contaminated when paint or ink is filtered. In this invention, a cartridge filter element is contained in a bag-like body or a cylindrical body made of an aqueous non-osmotic film.

4 Claims, 3 Drawing Sheets

CARTRIDGE FILTER INCORPORATING A BAG-LIKE BODY

BACKGROUND OF THE INVENTION

This invention relates to a cartridge filter having a construction for preventing a filter housing from being contaminated when paint or ink is being filtered.

In processes for producing paint or ink, a filter cartridge is generally used to filter the paint or ink immediately before the paint or ink is filled in a vessel such as a can or a drum.

The cartridge filter element cartridge used for this purpose is fixed in a filter housing to separate insoluble material contained in a liquid such as paint by supplying the paint to be filtered into the filter housing while under pressure it and passing the paint from the outside of the cartridge element to the inside of the cartridge element.

Thus, according to this process, the inside of the filter housing is contaminated with the paint. Accordingly, when paint of a different color is filtered through the cartridge filter, the interior of the filter housing must be cleaned. This is not only very troublesome work but disadvantageous in terms of working efficiency and productivity due to an increase in the working steps since the filter housing must be cleaned every time when a number of different colored paints must be filtered.

In order to filter a liquid paint or ink containing a hardener such as a magnetic paint in an in-line, a cartridge filter in which a filtering material is wound on a porous cylinder is mounted in a filter case, and the liquid to be treated is introduced from the inlet of the filter case through a pipe. The liquid is passed from the outside of the cartridge filter element to the inside so as to separate insoluble materials and the filtrate is exhausted from the outlet of the filter case through a pipe.

Therefore, since the inside of the filter housing or case is contaminated with the paint even in this case, the interior of the filter housing must be cleaned when the cartridge filter element is exchanged in the case that the product to be filtered is altered. Further, in the situation of the paint containing the hardener like the magnetic paint, the adhering is immediately hardened when it is contacted with the air. Thus, the task requires brushing or cleaning with a large quantity of solvent. This type of cleaning is extremely troublesome work and is disadvantageous since the working efficiency and the productivity are not raised. In addition, since it is very difficult to clean a long filter case by brushing or cleaning with a solvent, there arises a problem that the length of the cartridge filter which can be used is limited.

BRIEF SUMMARY OF THE INVENTION

An object of this invention is to provide a cartridge filter which can eliminate the above-mentioned drawbacks, and which does not need cleaning in a filter housing even if material being filtered is changed in terms of the color or the product.

Another object of this invention is to provide a cartridge filter which can employ a filter housing of desired length in an in-line.

Still another object of this invention is to provide a cartridge filter which can dispose of detrimental solvent without externally dispersing the solvent as it is.

Still another object of the invention is to provide a cartridge filter which can continue to filter without replacement even if the interior of a filter housing is contaminated.

The above and other related objects and features of the invention will be apparent from a reading of the following description of the disclosure found in the accompanying drawings and the novelty thereof.

DETAILED DESCRIPTION OF THE PREFERRED EMBODIMENTS

The construction of a cartridge filter of one aspect of this invention for performing the above-mentioned objects comprises a cartridge filter element contained in a bag-like body made of aqueous non-osmotic film and opened at one end thereof, said bag-like body fixed at the other end thereof to the end of the body cartridge filter element at the exhaust side of filtrate.

The cartridge filter of another aspect of this invention comprises a cartridge filter element contained in a cylindrical body opened at both ends and made of an aqueous non-osmotic film, a filter case having an inlet covered with one end opening of the cylindrical body for liquid to be filtered for containing the cartridge filter element and the cylindrical body, said cylindrical body covered at the other end opening with an outlet of the filter case for the filtrate.

Preferred embodiments of this invention will be described with reference to the accompanying drawings.

Figure 1:
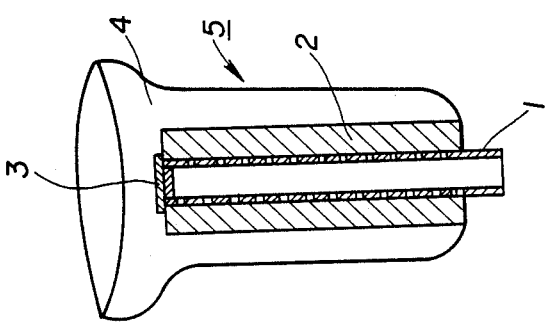
FIG. 1 is a sectional view showing an embodiment of a cartridge filter according to the present invention.

FIG. 1 is a sectional view of a first embodiment of this invention, showing an embodiment of a cartridge filter element 5 in which a filtering material 2 is wound on a porous cylinder 1, and the cartridge filter element is engaged with a plug 3 at the end of the porous cylinder 1 to the inlet side of the liquid to be filtered and a cartridge filter element is contained in a bag-like body 4 formed of a synthetic resin film made of polyethylene or polypropylene.

The bag-like body 4 is opened in a flared shape at the inlet side of the liquid to be filtered, and fixed at its other end to the outer periphery of the porous cylinder 1 at the outlet side of the filtrate.

Then, operation of the first embodiment of the cartridge filter constructed as set forth above will be described.

Figure 2:
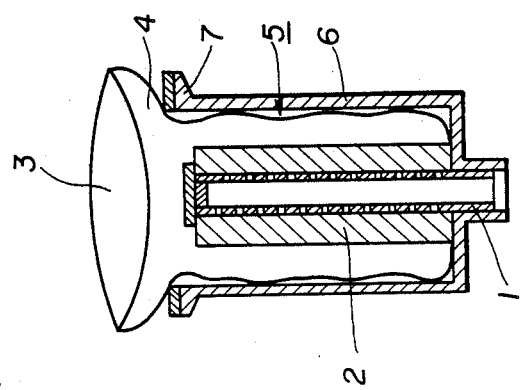
FIGS. 2 to 5 are sectional views for explaining the filtering steps using the cartridge filter of the invention in FIG. 1.
Figure 3:
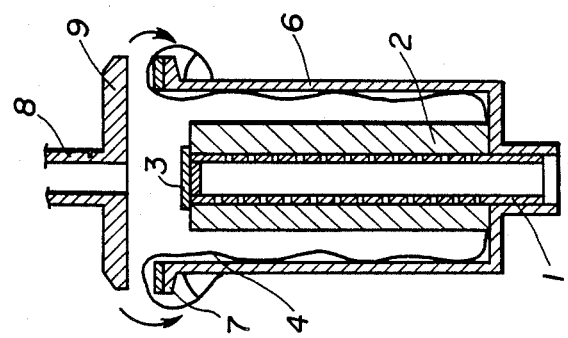

As shown in FIG. 2, the filter cartridge 5 of this invention is contained in a filter housing 6. Then, as shown in FIG. 3, the flared upper end of the bag-like body 4 is bent or folded radially outwardly to enclose the upper end flange 7 of the filter housing 6. Thereafter, a cover 9 having a liquid inlet conduit 8 on the outer surface thereof is placed at the center of the upper end flange 7 of the filter housing 6, and the filter housing 6 is secured to the cover 9 by a clamp 10 as shown in FIG. 4.

Figure 4:
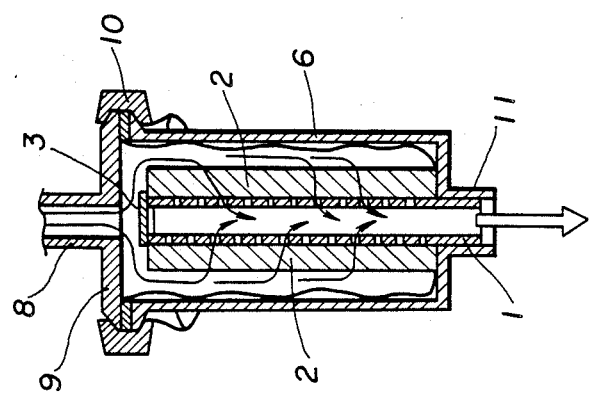

As shown in FIG. 4, liquid to be filtered, such as paint, is then introduced through the inlet conduit 8 into the bag-like body 4 contained in the filter housing 6. The liquid thus introduced is exhausted from an outlet 11 by passing through the filtering material 2 and the porous cylinder 1 as shown by the arrows. In this manner, since the paint thus filtered does not contact directly the inner surface of the filter housing 6, the inner surface of the filter housing 6 is not contaminated with the paint.

Figure 5:
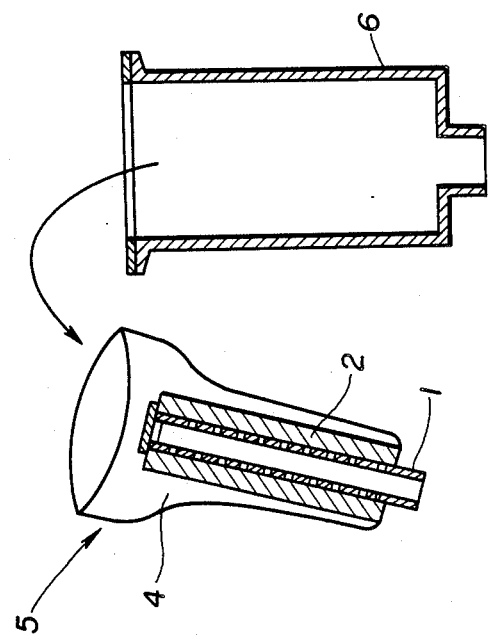

After the filtering is operation finished, the filter cartridge 5 of this invention is removed from the filter housing 6 as shown in FIG. 5, and the top of the bag-like body 4 is suitably bound, and a suitable plug is engaged with the porous cylinder 1 projected from the lower end of the bag-like body 4. Then, since the detrimental solvent of the paint or the like is not externally dispersed, it can be disposed of as it is.

In the embodiment described above, the upper end of the bag-like body is opened in the flared shape. However, this invention is not limited to that particular embodiment as it may not always be formed in this manner. For example, the upper end of the bag-like body may be passed through the conduit 8 of the cover 9 and bent or folded externally at the connecting portion of the inlet conduit to be fixedly held at that point.

Figure 6:
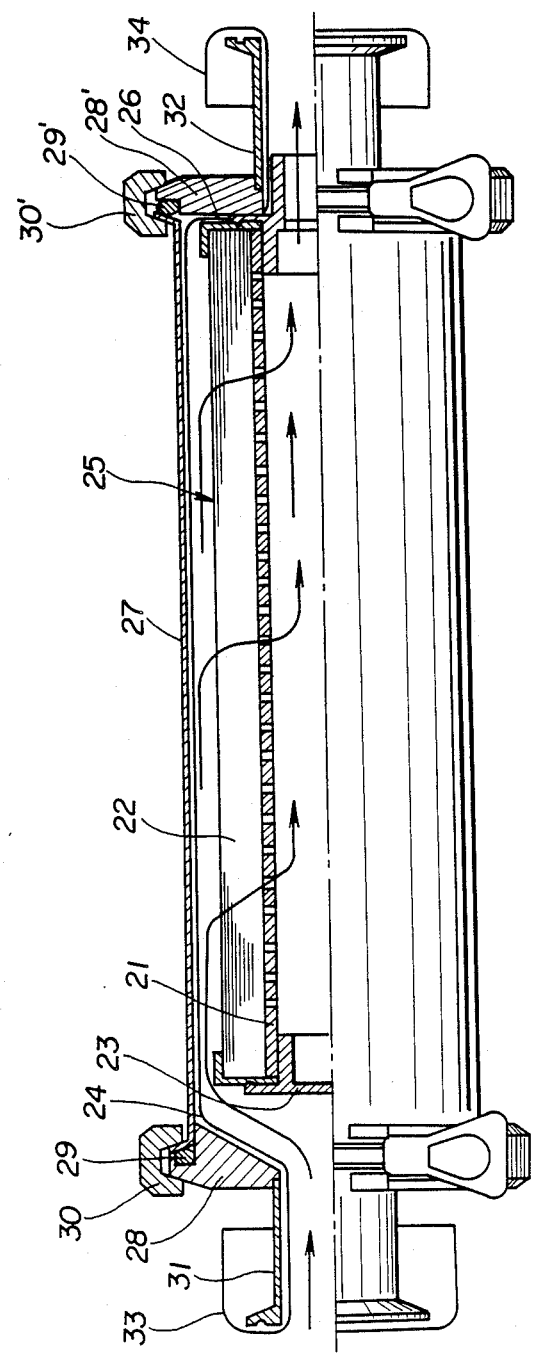
FIG. 6 is a sectional view showing another embodiment of this invention.

FIG. 6 shows a sectional view of the half of another or second embodiment of a cartridge filter of this invention. The cartridge filter includes a cartridge filter element 25 having filtering material 22 is wound on a porous cylinder 21, the cartridge filter element engaged with a plug 23 at the end of a porous cylinder 21 of the inlet of liquid to be filtered and the cartridge filter enclosed in a cylindrical body 24 made of an aqueous non-osmotic film. The material forming the cylinder body 24 is not limited particularly if it has aqueous non-osmosis, and is preferably formed of a synthetic resin film made of polyethylene or polypropylene.

The cylindrical body 24 is bonded, press-bonded or fusion-bonded to the cartridge filter element 25 at the rear end 26 of the cartridge filter element, and is contained in a filter case 27.

Ferrules 28 and 28' are respectively contacted through O-rings 29 and 29' with the front and rear end openings of the filter case 27, and connected to the case by clamps 30 and 30'.

Conduits 31 and 32 are respectively connected to the centers of the ferrules 28 and 28' to form an inlet 31 and an outlet 32.

One end 33 of the cylindrical body 24 passes through the inlet 31 and is to be bent outwardly to cover the inlet, and the other end 34 of the cylindrical body is passes through the outlet 32 and is to be bent outwardly to cover the. The cylindrical body 24 may be integrally molded entirely or may be a plurality of separated cylindrical bodies integrally coupled. Conduits are respectively connected to the inlet 31 and the outlet 32. In this case, the cylindrical body film performs in the role of a sealing material.

In the first and second embodiments described above, the filtering material is wound on the porous cylinder as the cartridge filter element. However, this invention is not limited to the particular embodiments. For example, other depth type cartridge filter elements or area type (e.g., pleating type) may be employed. Thus, the type of the cartridge filter is not particularly limited.

The operation of the second embodiment of the cartridge filter constructed as described above will now be described.

Paint passing through a conduit (not shown) connected to the inlet 31 is, as shown by the arrows, passes through the filtering material 32 and the porous cylinder 31, and is exhausted from the outlet 32 through the conduit (not shown) connected to the outlet 32. Thus, since the paint thus filtered does not directly contact the inner surface of the filter housing, the inner surface of the filter housing is not contaminated with the paint at all.

After the filtering is completed, the cartridge filter element 25 of this invention is removed from the filter housing or case 27, and the cylindrical body 24 is bound at both ends about the filter cartridge. Then, the detrimental solvent of the paint is not externally dispersed, but can be disposed of as it is.

According to the present invention as described above, the cartridge filter element is contained in the cylindrical body made of the aqueous non-osmotic film. Therefore, since the liquid to be filtered element, such as the paint is passed through the cylindrical body, the filter housing is not contaminated therewith. Thus, when the cartridge filter is exchanged, it is not necessary to clean the interior of the filter housing. Consequently, the working efficiency and the productivity is remarkably improved, and long filter housing and cartridge filter element may be employed. Furthermore, after the filtering is finished and when the cylindrical body is bound at both ends, the detrimental solvent of the paint is not externally dispersed. Thus, it can be disposed of as it is. Moreover, according to this invention, since the liquid to be filtered does not directly contact the interior of the filter housing, even if the interior of the filter housing is contaminated, it can still filter without contamination problems.

What is claimed is:

1. A cartridge filter for filtering a liquid to produce a filtrate, which comprises:

a cartridge filter element contained in a bag-like body made of aqueous non-osmotic film and open at one end thereof, said bag-like body fixed at the other end thereof to the end of the cartridge filter element at the exhaust side for the filtrate, and a filter case about the bag-like body having an inlet for the liquid, said bag-like body covered at the open end with an inlet of the filter case, the bag-like body preventing the liquid from contacting interior walls of the filter case.

2. The cartridge filter according to claim 1, wherein said cartridge filter element is composed by winding a filtering material on a porous cylinder.

3. The cartridge filter according to claim 1, wherein said aqueous non-osmotic film is of a synthetic resin film.

4. A cartridge filter for filtering a liquid to produce a filtrate, which comprises:

a cartridge filter element contained in a cylindrical body open at both ends and made of an aqueous non-osmotic film, and a filter case having an inlet for the liquid to be filtered covered with one end opening of the cylindrical body, the case containing the cartridge filter element and the cylindrical body, said cylindrical body covered at the other end opening with an filtrate outlet of the filter case, the cylindrical body preventing the liquid from contacting interior walls of the filter case.

* * * * *